United States Patent
Patel et al.

(10) Patent No.: US 10,705,951 B2
(45) Date of Patent: Jul. 7, 2020

(54) SHARED FABRIC ATTACHED MEMORY ALLOCATOR

(71) Applicant: HEWLETT PACKARD ENTERPRISE DEVELOPMENT LP, Houston, TX (US)

(72) Inventors: Yuvraj Patel, Palo Alto, CA (US); Yupu Zhang, Palo Alto, CA (US); Daniel Gmach, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/885,044

(22) Filed: Jan. 31, 2018

(65) Prior Publication Data
US 2019/0236001 A1    Aug. 1, 2019

(51) Int. Cl.
*G06F 12/02* (2006.01)
*G06F 3/06* (2006.01)

(52) U.S. Cl.
CPC .......... *G06F 12/023* (2013.01); *G06F 3/0631* (2013.01); *G06F 3/0644* (2013.01); *G06F 12/0284* (2013.01)

(58) Field of Classification Search
CPC .... G06F 12/023; G06F 3/0644; G06F 3/0631; G06F 12/0284
See application file for complete search history.

(56) References Cited

U.S. PATENT DOCUMENTS

| | | | | |
|---|---|---|---|---|
| 5,784,699 A | * | 7/1998 | McMahon | G06F 12/023 711/170 |
| 6,131,150 A | * | 10/2000 | DeTreville | G06F 12/0223 711/170 |
| 6,148,349 A | * | 11/2000 | Chow | G06F 15/17375 709/214 |
| 6,578,129 B1 | * | 6/2003 | da Silva Junior | G06F 12/08 707/999.1 |

(Continued)

FOREIGN PATENT DOCUMENTS

WO    2017/087002 A1    5/2017

OTHER PUBLICATIONS

Yu, S. et al.; "Megalloc: Fast Distributed Memory Allocator for NVM-Based Cluster"; Aug. 7-9, 2017; 9 pages.

*Primary Examiner* — Francisco A Grullon
(74) *Attorney, Agent, or Firm* — Dhand Law PC

(57) ABSTRACT

An example system comprises one or more processing nodes to execute one or more processes; a switching fabric coupled to the one or more processing nodes; a fabric-attached memory (FAM) coupled with the switching fabric; and a memory allocator to allocate and release memory in the FAM in response to memory allocation requests and memory release requests from the one or more processes. The memory allocator is to partition the FAM into a memory shelf comprising a plurality of memory books of equal size. The memory allocator is to map a shelf into a virtual memory zone, the zone aligned with the boundaries of one or more books. The memory allocator is to maintain an (Continued)

indexed free-memory list where each index level is an entry point to a list of free memory blocks of a particular size in the zone, and the memory allocator to maintain a bitmap of the zone to identify if a memory block of a particular size is allocated.

15 Claims, 15 Drawing Sheets

(56) References Cited

U.S. PATENT DOCUMENTS

| | | | | |
|---|---|---|---|---|
| 7,610,468 | B2* | 10/2009 | Madisetti | G06F 12/023 |
| | | | | 711/171 |
| 8,229,945 | B2* | 7/2012 | Dinker | G06F 12/0842 |
| | | | | 707/764 |
| 8,291,426 | B2 | 10/2012 | Gustafsson et al. | |
| 9,037,898 | B2* | 5/2015 | Arroyo | G06F 11/1438 |
| | | | | 714/4.2 |
| 2002/0032844 | A1* | 3/2002 | West | G06F 9/5016 |
| | | | | 711/171 |
| 2002/0144073 | A1* | 10/2002 | Trainin | G06F 12/023 |
| | | | | 711/170 |
| 2009/0240664 | A1* | 9/2009 | Dinker | G06F 12/0842 |
| 2012/0047316 | A1 | 2/2012 | Post et al. | |
| 2014/0173338 | A1* | 6/2014 | Arroyo | G06F 11/1438 |
| | | | | 714/15 |
| 2016/0026590 | A1* | 1/2016 | Park | G06F 1/206 |
| | | | | 710/316 |
| 2017/0068465 | A1* | 3/2017 | Schreter | G06F 16/22 |
| 2017/0206104 | A1 | 7/2017 | Sliwa et al. | |

* cited by examiner

SHARED FABRIC ATTACHED MEMORY ALLOCATOR

BACKGROUND

Multi-processor computing platforms with large shared memories typically employ memory allocators that require each node to manage its own memory heap, and include a thin distributed layer that manages each individual instance of heap, which impairs data sharing. Additionally, individual processors cannot release memory that has been allocated by another processor.

BRIEF DESCRIPTION OF THE DRAWINGS

For a more complete understanding of various examples, reference is now made to the following description taken in connection with the accompanying drawings in which.

DETAILED DESCRIPTION

Various examples are provided of a shared fabric attached memory allocator as part of a memory driven computer platform with multiple processing nodes, where each processing node can allocate and release memory in a large memory pool. The memory allocator may be provided as part of an application program interface (API) in a linked runtime library that uses atomic (i.e., interrupt-proof) function calls to enable lock-free memory allocation and memory release operations to be performed on the shared memory by multiple processing threads at the application level. The memory allocator facilitates scale-up (capacity growth) and scale-out (parallelism) by dynamically increasing the size of the shared memory pool, provides a "best-fit" response to memory allocation requests, and reduces memory fragmentation using global merge and consolidation functions. In one example, the memory allocator code is resident in local memory in each processing node of the memory driven computer platform, while the associated data structures are in the shared memory pool.

In one example, a memory driven computer includes one or more processing nodes to execute one or more processes of a shared application. Each processing node is coupled to a shared, fabric-attached memory (FAM) by a switching fabric. The fabric-attached memory may in general be any type of byte addressable memory. In various examples, without limitation, the FAM may be a form of non-volatile (persistent) memory such as phase change memory, memristor memory, or spin-torque transfer memory.

In one example, a librarian file system partitions the FAM into large memory units, each called a memory shelf (shelf). Each shelf is divided into smaller memory units of equal size called memory books (books). The memory allocator maps the physical memory of the shelf into a virtual memory space referred to as a memory zone (zone). A shelf usually contains only one zone and a zone may be of different sizes (less than the capacity of a shelf), depending on the needs of applications. Regardless of size, a zone always starts at offset 0 of the shelf and ends at the boundaries of books. In various examples, described in greater detail below, the memory allocator maintains an indexed, free-memory list in the zone where each index level is an entry point to a linked-list of free memory blocks of a particular size in the zone. The memory allocator also maintains a bitmap of the entire zone to identify if a memory block of a particular size is allocated.

Figure 1:
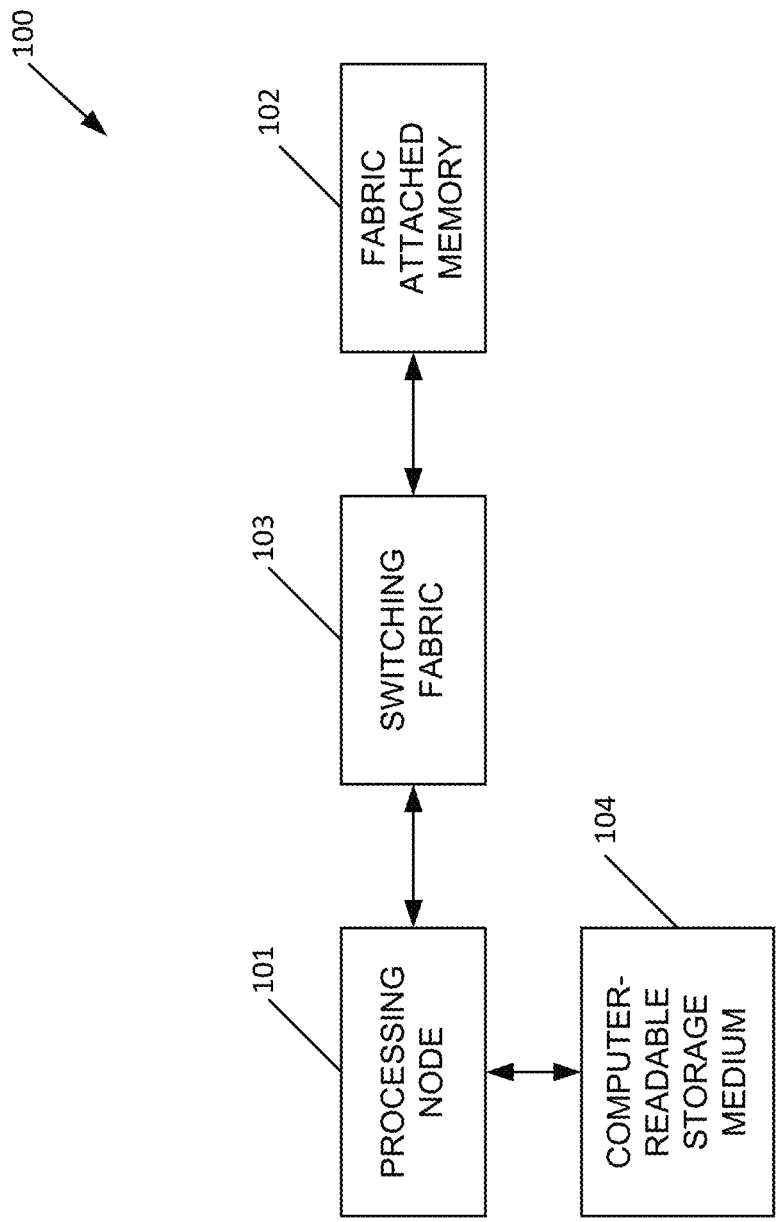
FIG. 1 illustrates an example system with an example processing node in a memory driven computer and its connections.

Turning now to the figures, FIG. 1 is a block diagram 100 illustrating an example processing node in a memory driven computer and its connections. As illustrated in FIG. 1, the processing node 101 is coupled to a fabric-attached memory 102 by a switching fabric 103. The switching fabric 103 may be any type of switching fabric, including any type of electrical or electro-optical switching fabric. Also illustrated in FIG. 1 is a computer-readable storage medium 104, which contains the code that runs at processing node 101.

Figure 2:
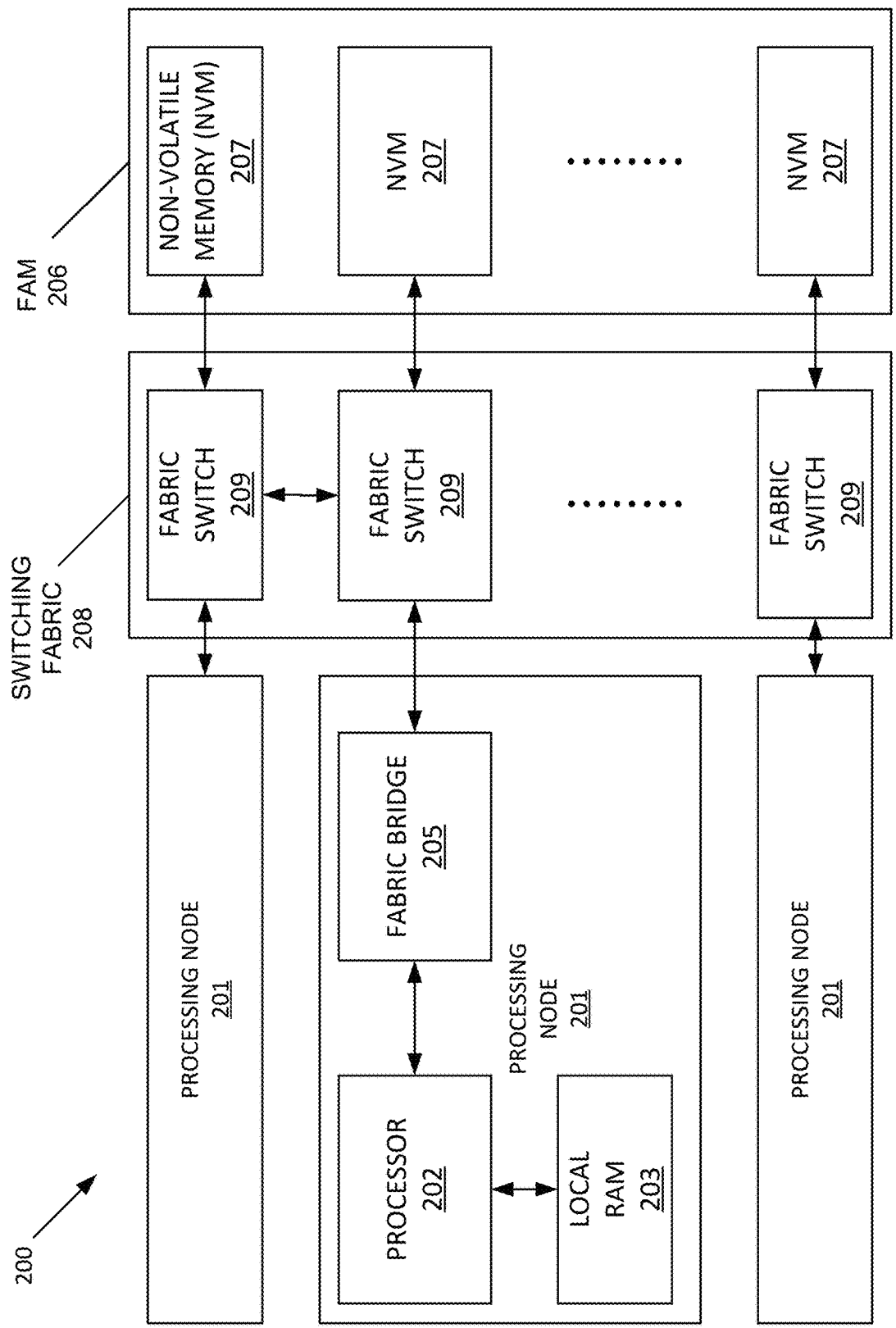
FIG. 2 illustrates multiple example processing nodes and their interconnections.

FIG. 2 is a block diagram 200 of several example processing nodes 201 and their interconnections. In the example of FIG. 2, a processing node 201 includes a processor 202 with local memory (RAM) 203, such as DRAM, for example. In various examples, processor 202 may be any type of general purpose processor, special purpose processor or logic. A local fabric bridge 205 connects the processor 202 to the fabric-attached memory 206 (with multiple instances of non-volatile memory 207) through switching fabric 208 (with multiple instances of fabric switches 209). It will be appreciated that this architecture allows every processing node 201 to access all of the non-volatile memory 207 and, in particular, to allocate and free memory blocks therein.

Figure 3:
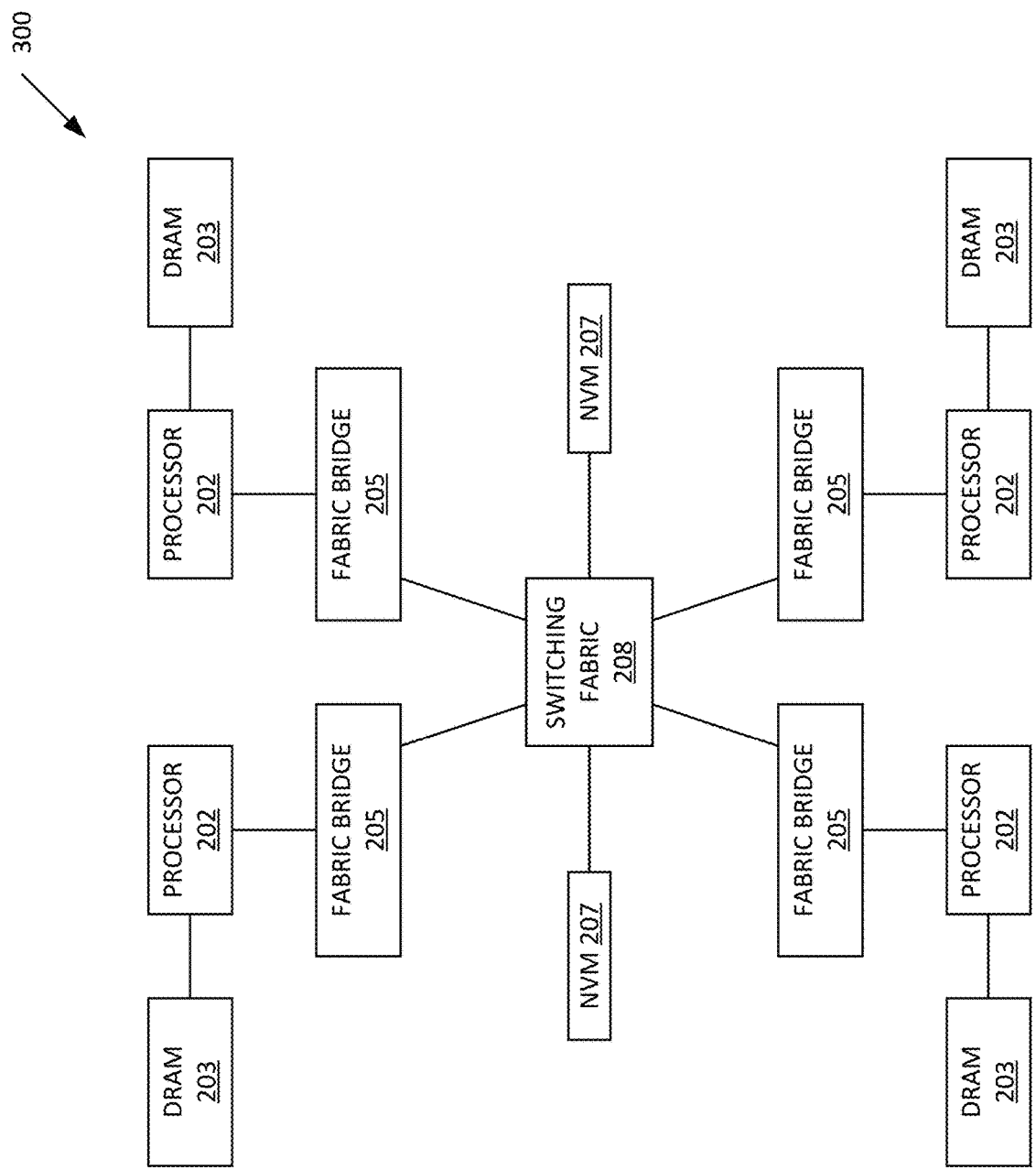
FIG. 3 illustrates another example processing node.

FIG. 3 is a block diagram of an example system 300, similar to system 200, but with the elements rearranged. It will also be appreciated from this arrangement that the fabric-attached memory (NVM) 207 on the same node as a processor 202 can be cache coherent, while NVM 207 on a different node may not be cache coherent. As described in greater detail below, this requires that memory allocation and memory release operations be atomic operations.

Figure 4:
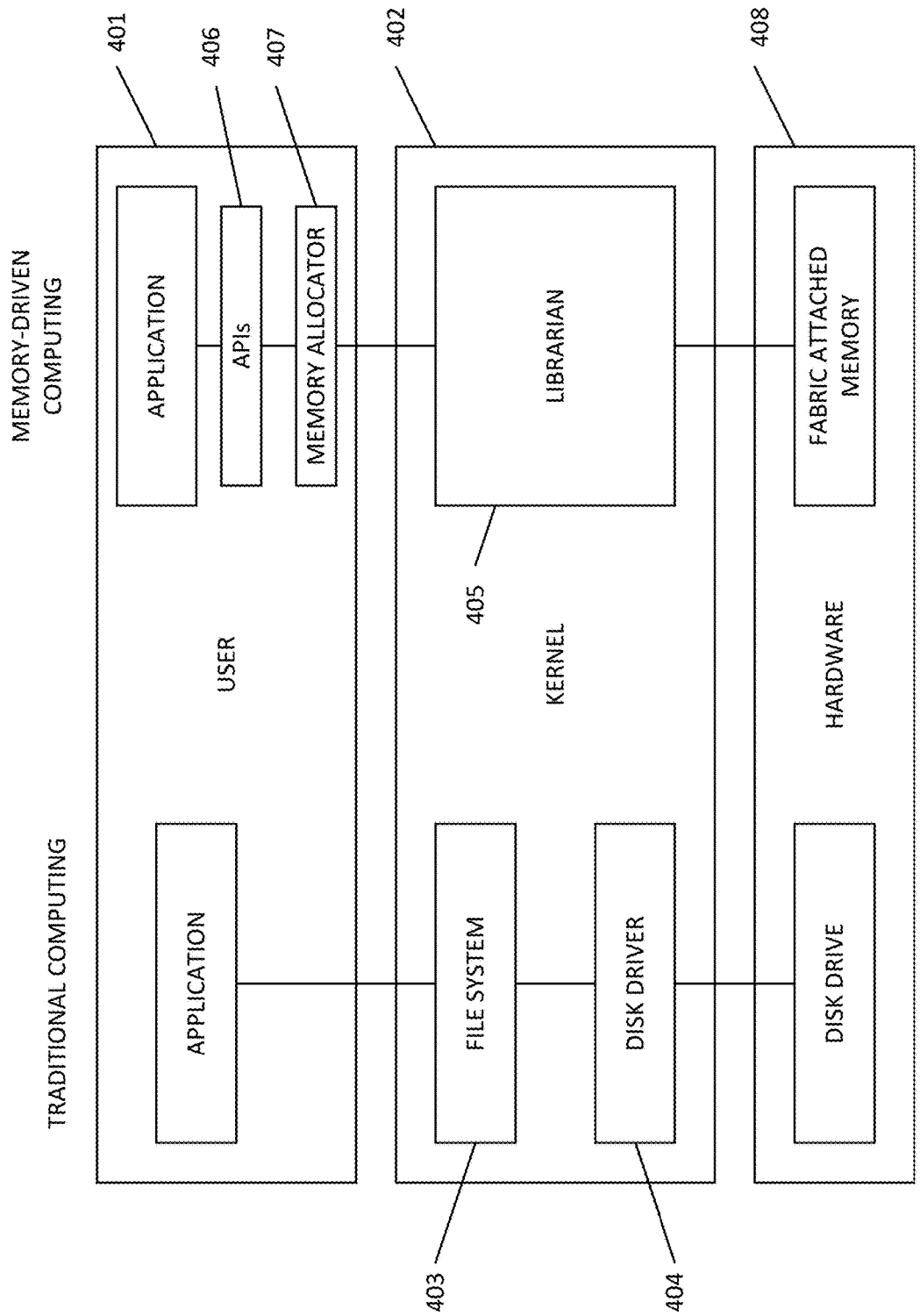
FIG. 4 illustrates a comparison of example systems.

FIG. 4 is a simplified block diagram illustrating a difference between traditional, processor-centric computing, and an example memory centric-computing system with respect to the management of non-volatile memory. In both approaches, applications run in the user space 401. In memory-driven computing, a memory allocator library 407 is also in the user space, along with application program interfaces (APIs) 406. In the kernel 402, the core of the operating system in processor-centric computing, the file system 403 and the disk driver(s) 404, are replaced by a memory management construct 405 referred to herein as the "librarian." The librarian 405 manages books and shelves. Both the memory allocator 407 and the librarian 405 are described in greater detail below. At the hardware level 408, traditional computing systems support a variety of hard drives, solid-state drives, flash drives, and the like. In the memory-centric paradigm, the librarian 405 provides access to a byte addressable fabric-attached memory, as described in greater detail below.

The maximum size of a shelf is determined by the maximum address space of the processors 202, as well as by the implementation of the librarian which provides the shelf abstraction. In one example, the memory allocator 407 (see FIG. 4) may establish a shelf size of 1 TB with 8 gigabyte (GB) books. In one example, the initial size of a virtual memory zone may coincide with a single book (e.g., 8 GB), and then be increased as additional memory is needed up to the entire size of the shelf. Additional memory needs may be accomplished by increasing the size of the shelf or adding another shelf if there is sufficient physical memory available for mapping.

Figure 5:
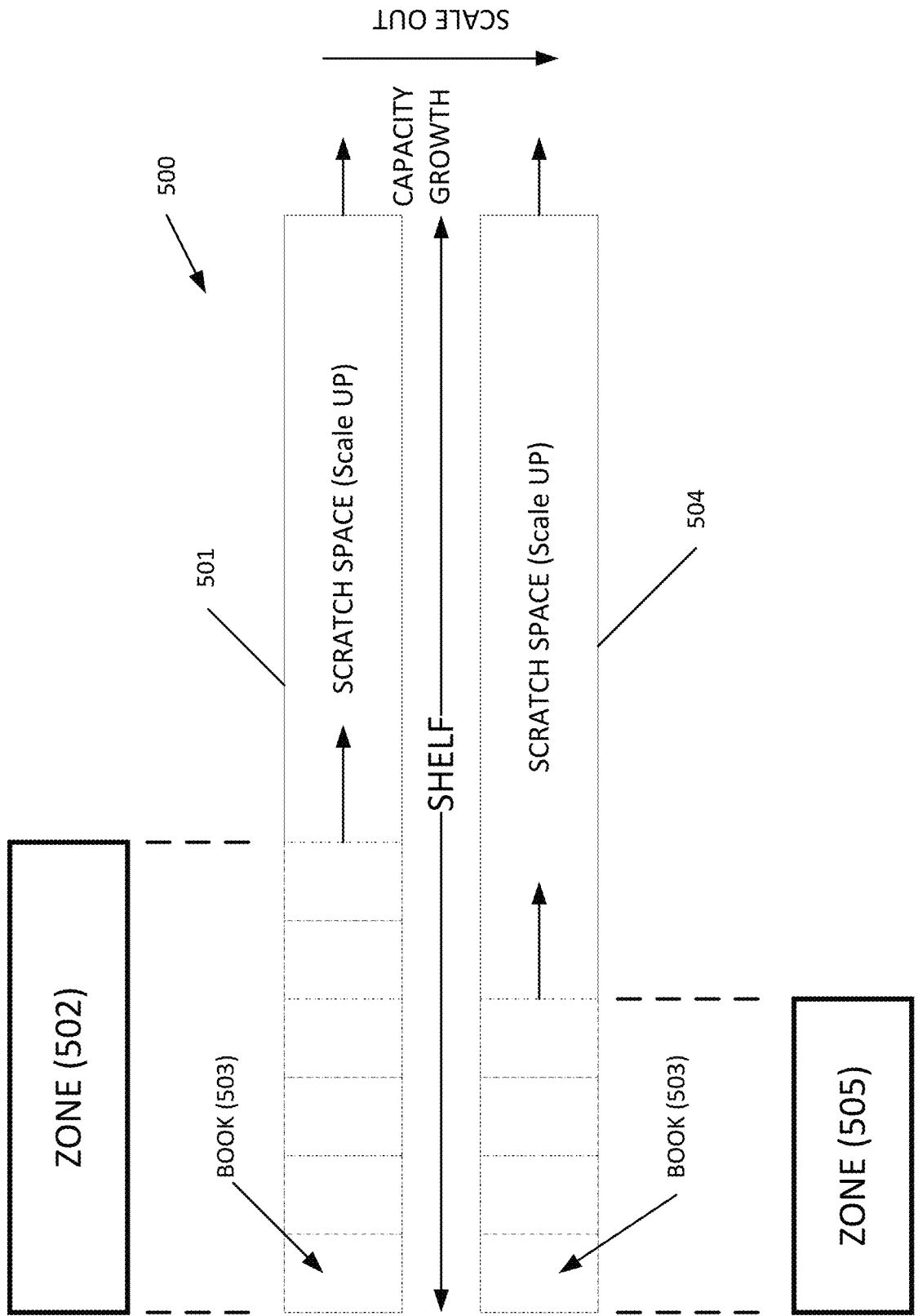
FIG. 5 illustrates an example fabric-attached memory space.

FIG. 5 illustrates an example fabric-attached memory space 500 illustrating the concepts of shelves, books, and zones as described above. In FIG. 5, a memory shelf 501 containing a number of memory books 503 is mapped to a virtual memory zone 502. A second shelf 504 is mapped to a virtual memory zone 505. As illustrated in FIG. 5, unused memory (scratch space) in memory shelf 501 can be used to increase the size of memory zone 502 (scale up) up to the size of memory shelf 501. Additionally, memory shelf 501 can be grown, depending on any limits on the address space that is addressable by the processor 202. Parallelism (scale out) and throughput can also be increased by adding memory shelves, such as memory shelf 504, to the memory allocator 407. Additional shelves and zones increase allocation throughput by enabling more processing nodes to allocate and release memory in parallel.

Figures 6, 7:
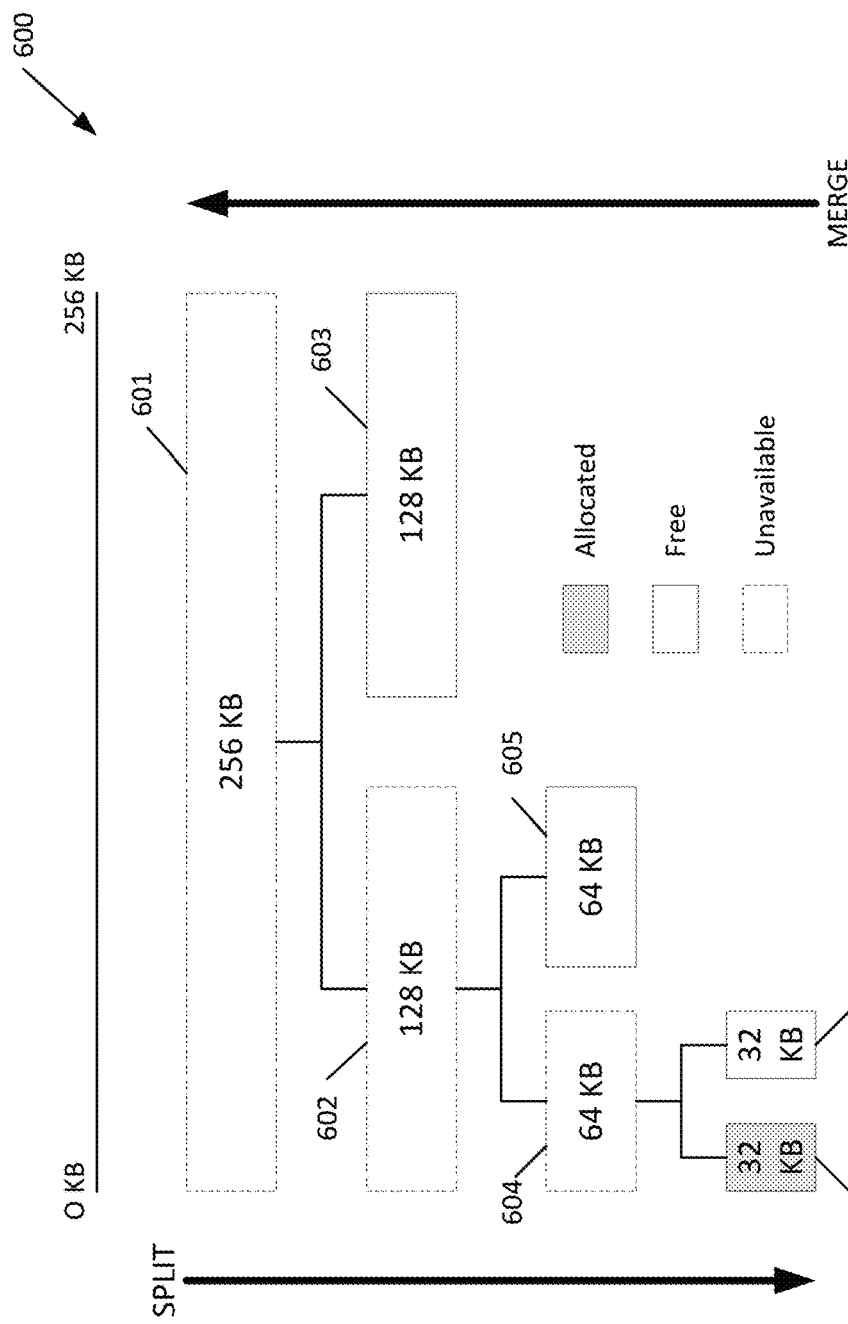
FIG. 6 illustrates an example memory allocation layout.
FIG. 7 illustrates one example memory configuration.

In one example, the data layout of the memory allocator is based on a buddy allocator where the memory is sequentially halved into smaller and smaller memory blocks until a memory block size is reached that is a best fit to a requested memory allocation size. In one example, the partition sizes are always powers of two to simplify address computations. This approach is illustrated schematically in FIG. 6, showing an example memory space 600 where the memory allocator has received a memory allocation request for a memory block of 32 KB, when initially, the smallest block of free memory is 256 KB (block 601). In response to the request, the memory allocator splits the 256 KB block 601 into two 128 KB blocks 602 and 603. Block 603 becomes free memory and the memory allocator splits the 128 KB block 602 into two 64 KB blocks 604 and 605. Block 605 becomes free memory and the memory allocator splits the 64 KB block 604 into two 32 KB blocks 606 and 607. Memory block 607 becomes free memory and memory block 606 is allocated to the requesting process. In general, the splitting process described above can be used whenever the size of a requested memory allocation is less than or equal to one-half of the smallest block of free memory in the fabric-attached memory.

To avoid confusion, it should be noted that the total memory available in FIG. 6, both allocated and free, is 256 KB. After the memory allocation request has been fulfilled, the 256 KB block of memory space 600 has the configuration illustrated in FIG. 7, where the 32 KB memory block 606 is allocated to the requesting process, the 32 KB block 607 is free, the 64 KB block 605 is free, and the 128 KB block 603 is free.

It will also be appreciated that the memory splitting process described above may be reversed into a memory merging process when the largest free memory block is smaller than the current memory allocation request. In one example, described in greater detail below, the memory allocator maintains an indexed, free-memory list in the zone, where each index level of the list is an entry point to a list of free memory blocks of a particular size in the zone. Upon receipt of the request, if the memory allocator cannot find a free memory block that satisfies the given request, it may try to perform the merging process or trigger a background merge. The memory allocator identifies contiguous free memory blocks from the free memory list that are smaller than the requested memory allocation. The memory allocator then merges the contiguous free memory blocks and repeats the process until the size of a merged memory block is equal to or larger than the requested memory block size, at which time the memory allocator allocates the merged memory to the requesting process. In one example, after the merge operation is completed, the memory allocator updates the free-memory list to reflect any changes in the free memory blocks.

In one example, described in greater detail below, in response to a memory allocation request from a process running on a processing node, the memory allocator returns a handle to the calling process/application that contains the address of the memory allocated and the index level where the allocated memory block is located.

In one example, the API 406 shown in FIG. 4 that provides the interface between applications/processes and the memory allocator 407 includes atomic memory allocation and release operations to allocate and release memory blocks. For the purpose of the present description, we can define these operations in terms of function calls. The function ALLOC(size) for memory allocation (where the parameter 'size' is the size of the memory requested). When called, ALLOC returns a handle P consisting of the address and index level of the allocated memory block as described above. Similarly, FREE(P) releases the memory block associated with the handle P.

Figure 8:
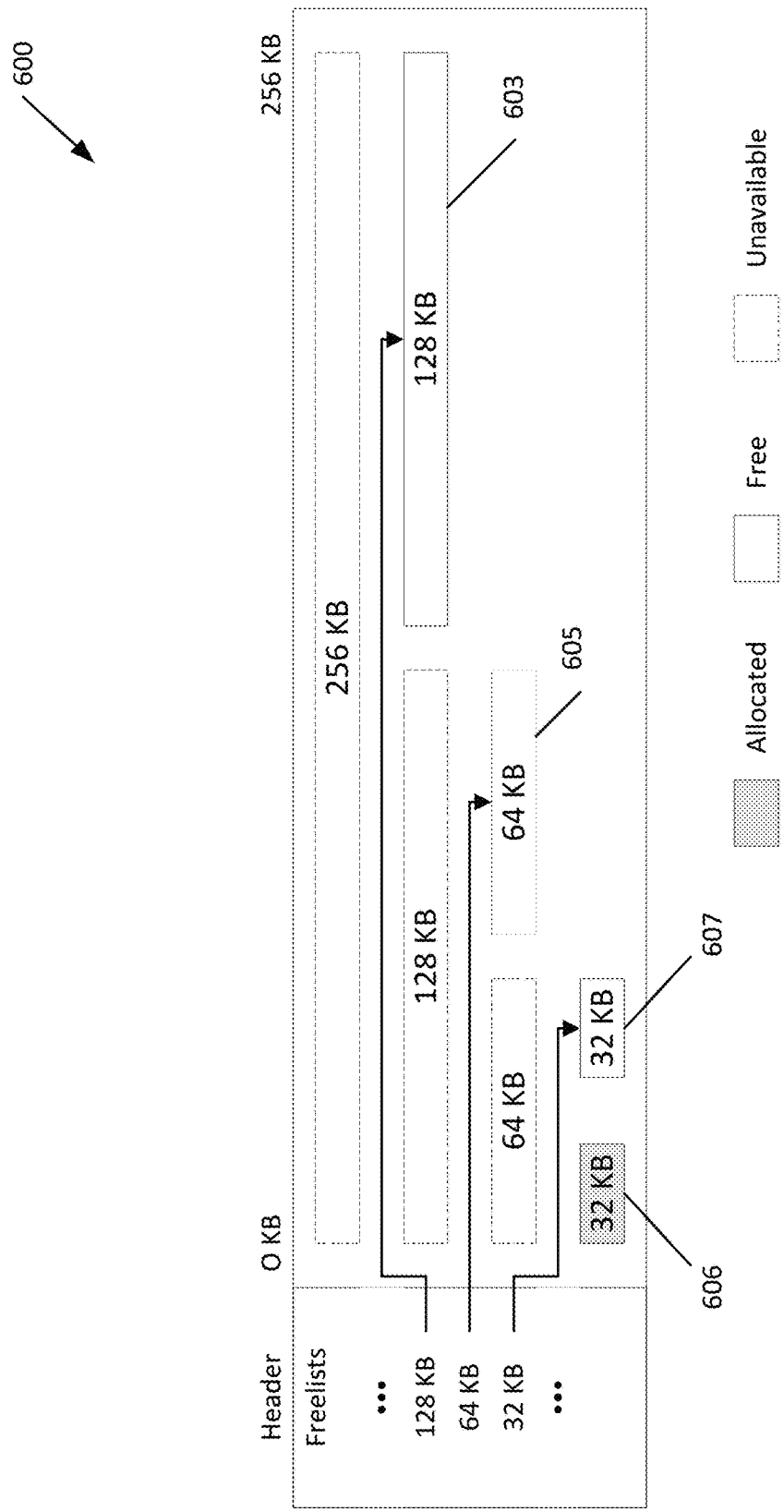
FIG. 8 illustrates an example free list arrangement.

To keep track of free memory, the memory allocator maintains an indexed free-memory list of each zone in FAM, so that it is accessible by every processing node. Continuing the example of the allocation of a 32 KB memory block from a 256 KB free memory block illustrated in FIG. 6, we can visualize the concept of the free list as illustrated in FIG. 8. In the example of FIG. 8, the free list is maintained in a header of the zone. The free list has an index level for each possible size of free memory. Each index points to the first instance of a memory block of that size. If there is more than one block of that size, then the first memory block in the list points to the next, and so on until all the free memory of that size is accounted for. A portion of each free memory block (e.g., the first 8 bytes) can be reserved for the pointer to the next free memory block of that size. In the example of FIG. 8, there is only one free memory block of 128 KB (603), one free memory block of 64 KB (605), and one free memory block of 32 KB (607), so the lists are artificially short as a result of the particular example of memory splitting. But continuing the example, we can illustrate how a free list would change when memory is released by a FREE(P) function call.

Figure 9:
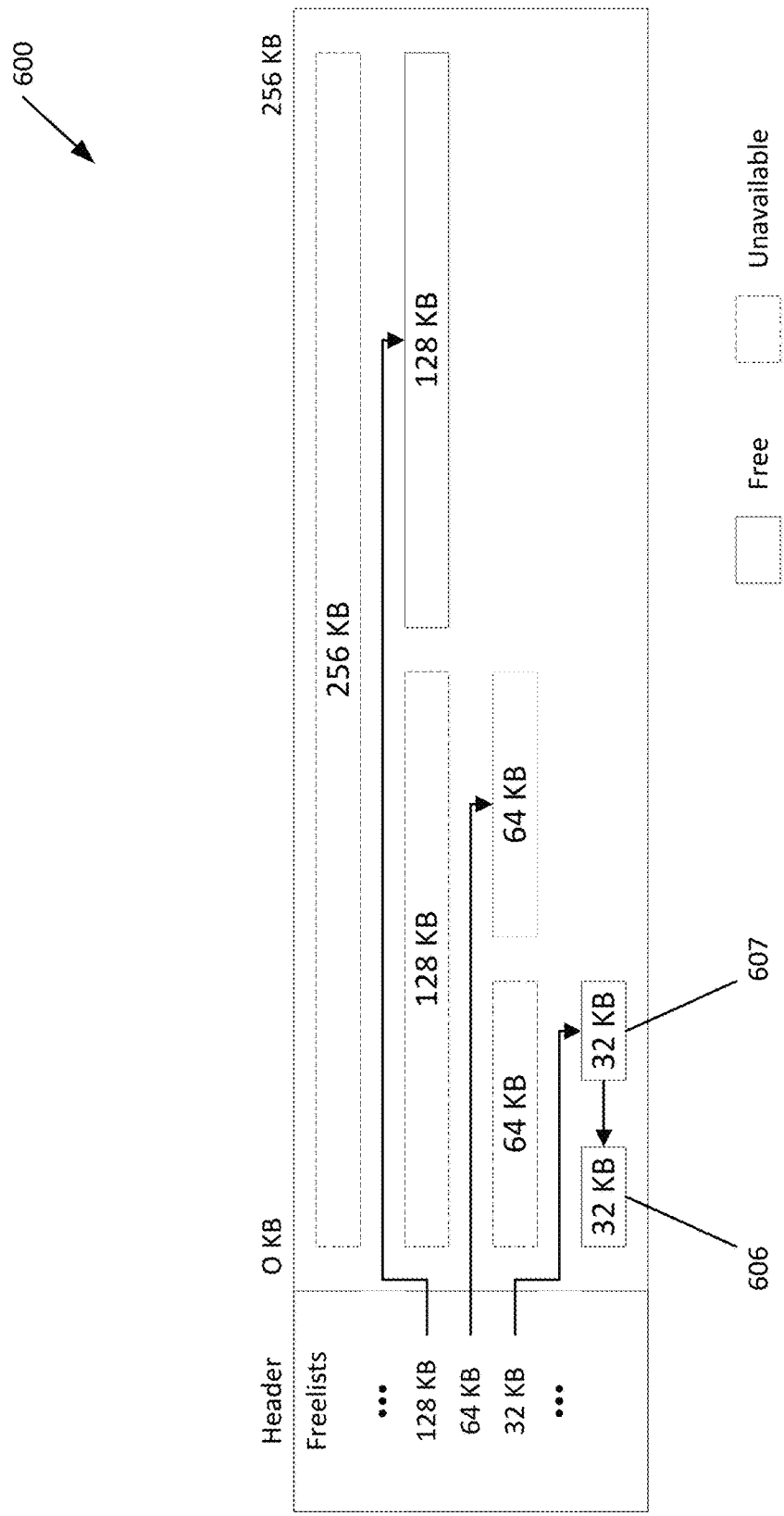
FIG. 9 illustrates a possible allocation of the free list arrangement of FIG. 8.

Referring now to FIG. 9, assume that the handle P refers to the 32 KB memory block 606, which was allocated (not free) in FIG. 8. After the call to free memory block 606, the free list for the 32 KB memory size can be visualized as shown in FIG. 9, where the first entry in the list (block 607) now points to the second block (block 606). It will be appreciated that FIGS. 8 and 9 are abstractions for the sake of illustration.

Figure 10:
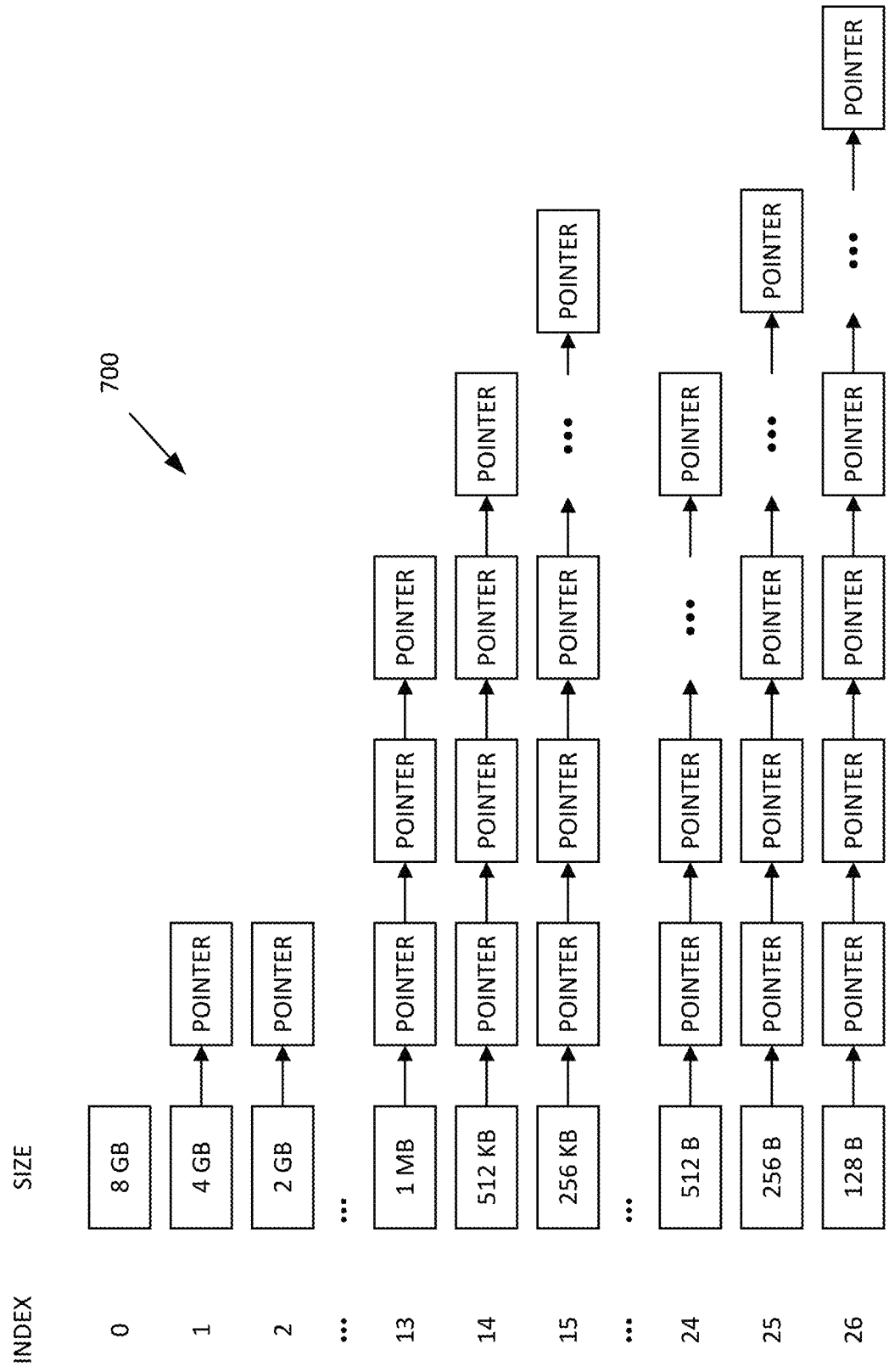
FIG. 10 illustrates another example free list arrangement.

FIG. 10 is a block diagram illustrating a free list 700 for a larger memory space. For the purpose of discussing FIG. 10, assume that the zone is 8 GB and the smallest memory block size is 128 bytes, perhaps corresponding to the cache-line size of a processing node, for example. Under these assumptions, the free list would have 27 levels (0 to 26) as illustrated in FIG. 10. The free list in this example is just an array of 27 linked lists that identifies all of the free memory in a zone.

Figure 11:
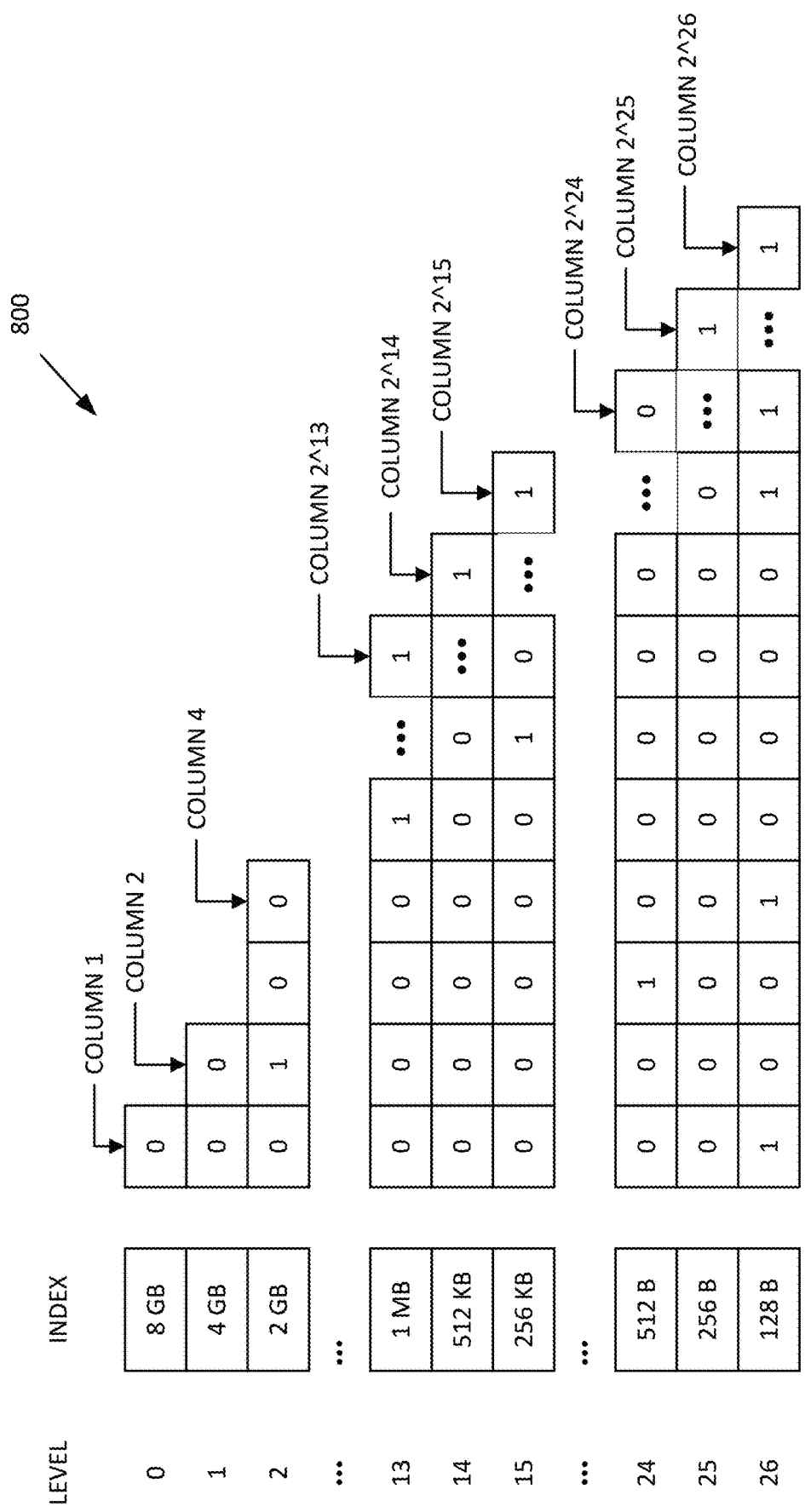
FIG. 11 illustrates an example bitmap corresponding to the example free list arrangement of FIG. 10.

Along with the free list, the memory allocator maintains a bitmap of the zone to identify if a memory block of any particular size is allocated (not free). FIG. 11 is an example bitmap 800 corresponding to the free list of FIG. 10 (8 GB zone with 128-byte granularity). A "1" in the bitmap signifies that the memory is allocated at that particular level, and a "0" in the bitmap signifies that the memory segment is either free or has been split and used at a level corresponding to a smaller size memory allocation. An invariant that is maintained by the bitmap is that if the bitmap is set to "1" at some level, then all the bitmap levels that represent the same physical memory at smaller size levels must be set to "0". This invariant can be used to determine if there is any inconsistency between the free list and the bitmap, which may be useful for recovery from an event like node failure or a power failure.

The size of the bitmap depends on the number of levels in the bitmap. At each level, the number of entries is 2^(Level #). For example, there is 1 entry at level 0, 2 entries at level 1, 4 entries at level 2, and so on. For the example of FIG. 11, the total memory overhead for the bitmap will be $2^0+2^1+2^2+ \ldots +2^{26}$=134,217,727 bits, which is approximately 16 MB. This is approximately 0.2% of the 8 GB of memory being managed. This percentage is independent of the amount of memory being managed. For example, the bitmap for a 1 TB zone would be 17,179,869,183, which is approximately 2 GB. The ratio of 2 GB to 1 TB is also approximately 0.2%. The size of the free list can also be calculated. Assuming that the pointer at each index level is 8 bytes, there will be 8*(# of levels) bytes. For the examples above, the free list for the 8 GB zone would require 8*27=216 bytes, and the free list for the 1 TB zone would require 8*33=264 bytes. As described above, each free memory block can contain a pointer (e.g., the first 8 bytes of the memory block) to the next free memory block of that size, so there is no additional overhead.

The memory allocation and release operations described above can, over time, result in a memory that is highly fragmented. For example, during a FREE operation, a local merge is not performed because it will increase the latency of the FREE operation. To address this problem, the merge operation described above (assembling a larger memory block from two contiguous memory blocks at the next lowest level) can be applied globally in the background to consolidate all free memory into the largest possible free memory blocks. In one example, a global merge (consolidation) on a zone is performed by the memory allocator as follows. First, starting at the lowest size memory block level, and working up to the largest size memory block level, sort all of the free list entries at each level according to memory address. Next, walk through the sorted free list entries to identify all contiguous "buddies" (adjacent pairs of memory blocks) and merge them into the next larger level of memory size by modifying the bitmap and updating the free list. This process of identifying buddies and merging them into the next level may be repeated until there are no more buddies to be merged.

Figure 12:
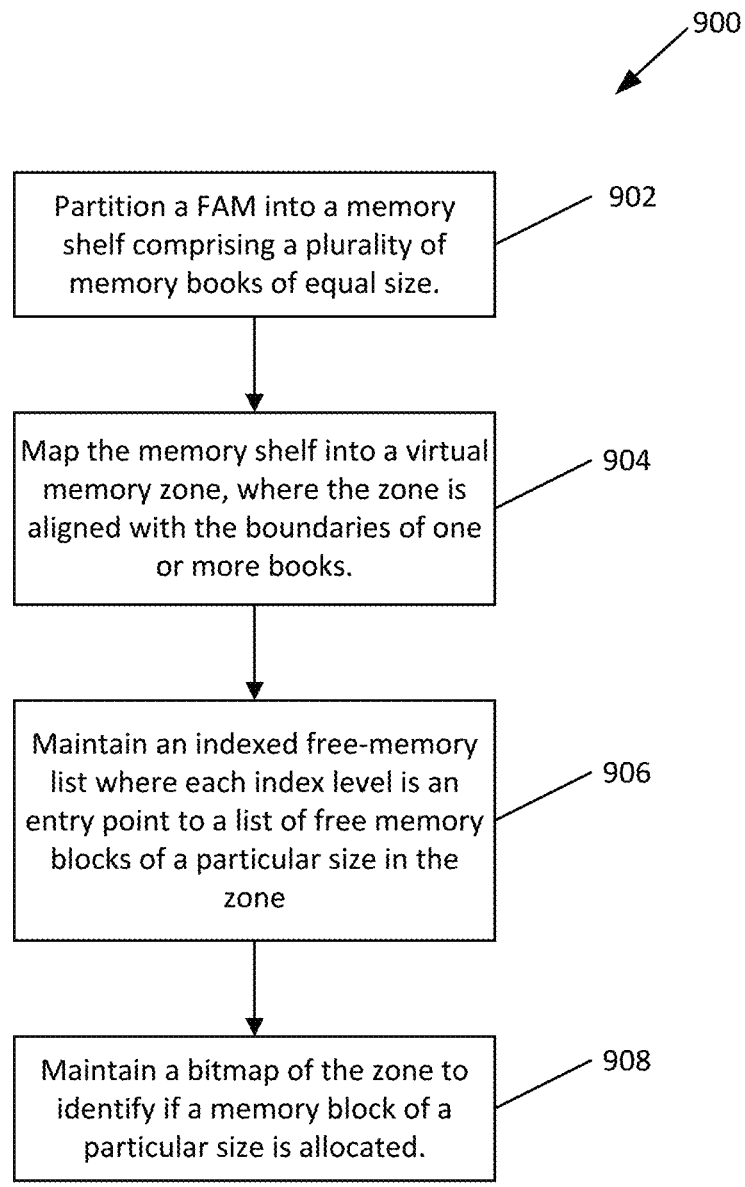
FIG. 12-15 are flowcharts illustrating example methods for allocating a shared fabric-attached memory.

Referring now to FIG. 12, a flowchart illustrates an example method for managing a pool of shared fabric-attached memory (FAM). Example method 900 of FIG. 12 may be implemented, for example, in processing node 201 of FIG. 2. The example method 900 includes partitioning a FAM into a memory shelf (shelf) comprising a plurality of memory books (books) of equal size, as illustrated in FIG. 5 (operation 902). The example method 900 continues by mapping the shelf into a virtual memory zone (zone), where the zone is aligned with the boundaries of one or more books, as illustrated in FIG. 5 (operation 904). The example method 900 also includes maintaining an indexed free-memory list, such as free memory list 700 of FIG. 10, where each index level is an entry point to a list of free memory blocks of a particular size in the zone (operation 906). Finally, the example method 900 includes maintaining a bitmap of the zone, such as bitmap 800 in FIG. 11, to identify if a memory block of a particular size is allocated (operation 908).

Figure 13:
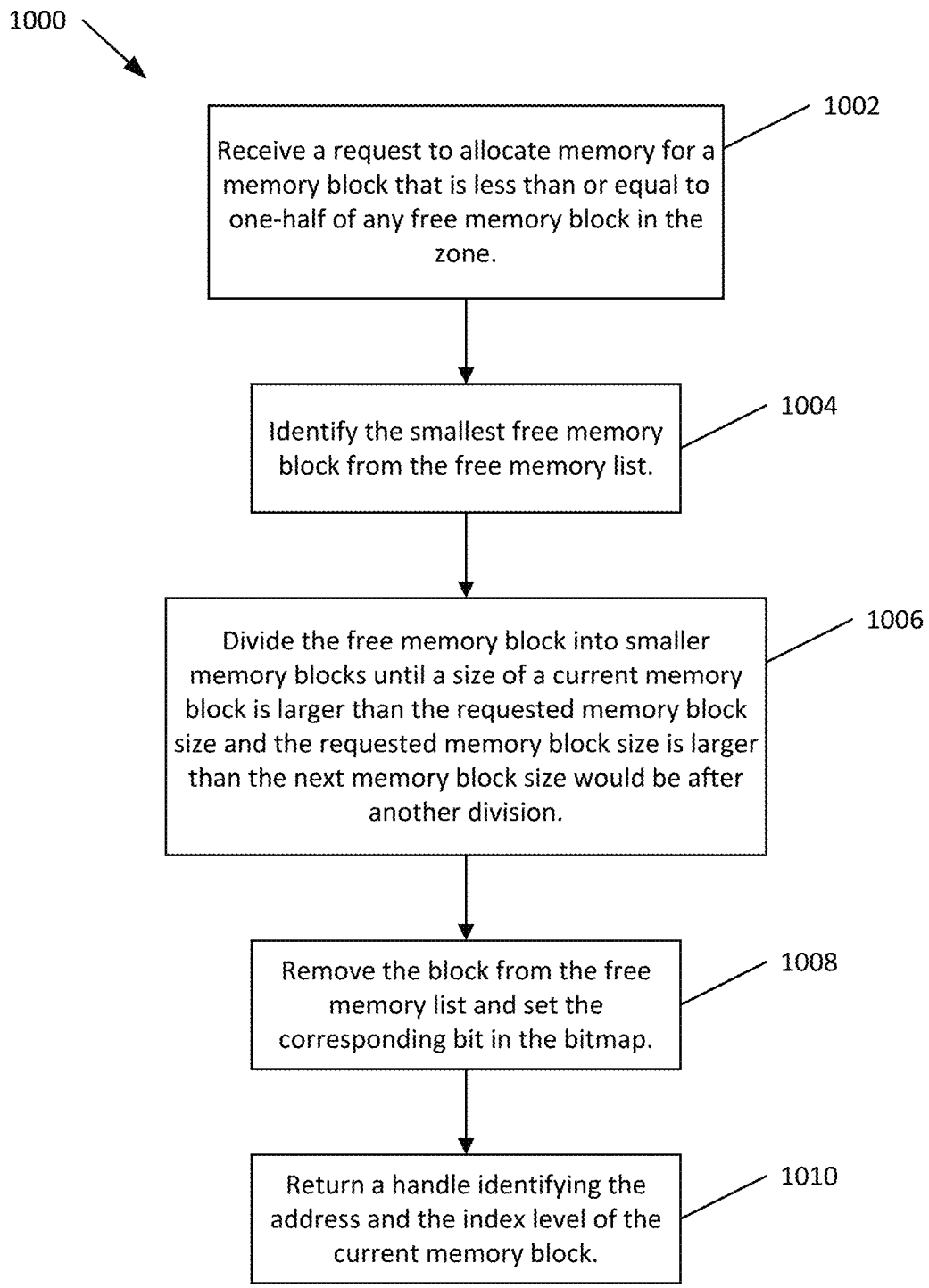

FIG. 13 is a flowchart of an example method 1000 for allocating a memory block when the smallest free memory block in the zone is at least twice the size of a requested memory block. At operation 1002 of example method 1000, the memory allocator receives a request to allocate memory for a memory block that is less than or equal to one-half of any free memory block in the zone (such as the allocation request illustrated in FIG. 7). At operation 1004 of the example method 1000, the memory allocator identifies the smallest free memory block from the free memory list. At operation 1006 of the example method 1000, the memory allocator divides the free memory block into smaller memory blocks until a size of a current memory block is larger than the requested block size and the requested memory block size is larger than the next memory block size would be after another division. At operation 1008 of the example method 1000, the memory allocator allocates the current memory block by removing the block from the free memory list and setting the corresponding bit in the bitmap. At operation 1010 of the example method 1000, the memory allocator returns a handle identifying the address and the index level of the current memory block.

Figure 14:
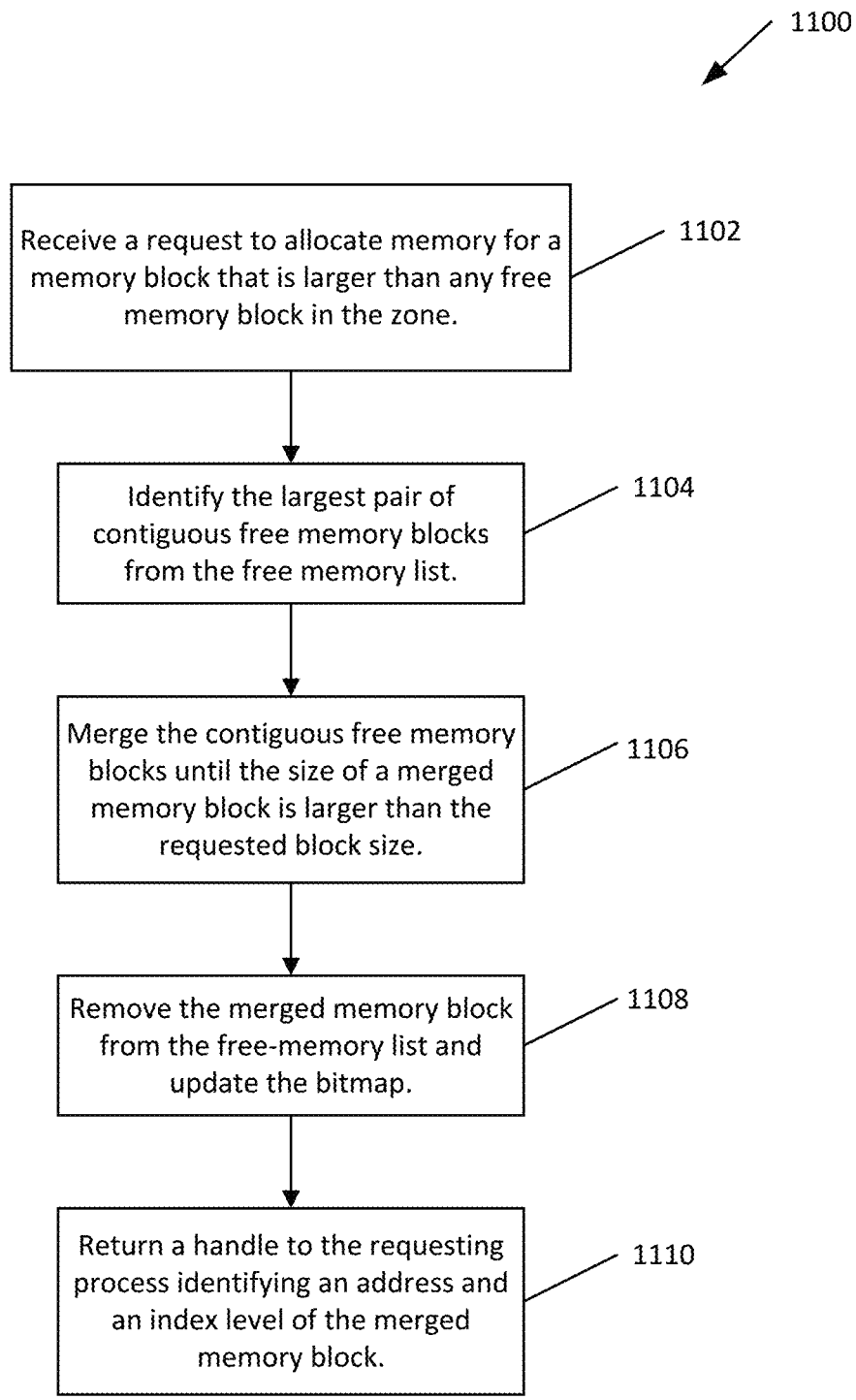

FIG. 14 is a flowchart of an example method 1100 for allocating a memory block when the largest free memory block is smaller than the size of a requested memory block. At operation 1102 of the example method 1100, the memory allocator receives a request to allocate memory for a memory block that is larger than any free memory block in the zone. At operation 1104 of the example method 1100, the memory allocator identifies the largest contiguous free memory blocks from the free memory list. At operation 1106 of the example method 1100, the memory allocator merges the contiguous free memory blocks and moves them up the list to a next higher level until the size of a merged memory block is larger than the requested block size. At operation 1108 of the example method 1100, the memory allocator allocates the merged memory block by removing the merged block from the free memory list and setting the corresponding bit in the bitmap. At operation 1110 of the example method 1100, the memory allocator returns a handle to the requesting process identifying an address and an index level of the merged memory block.

Figure 15:
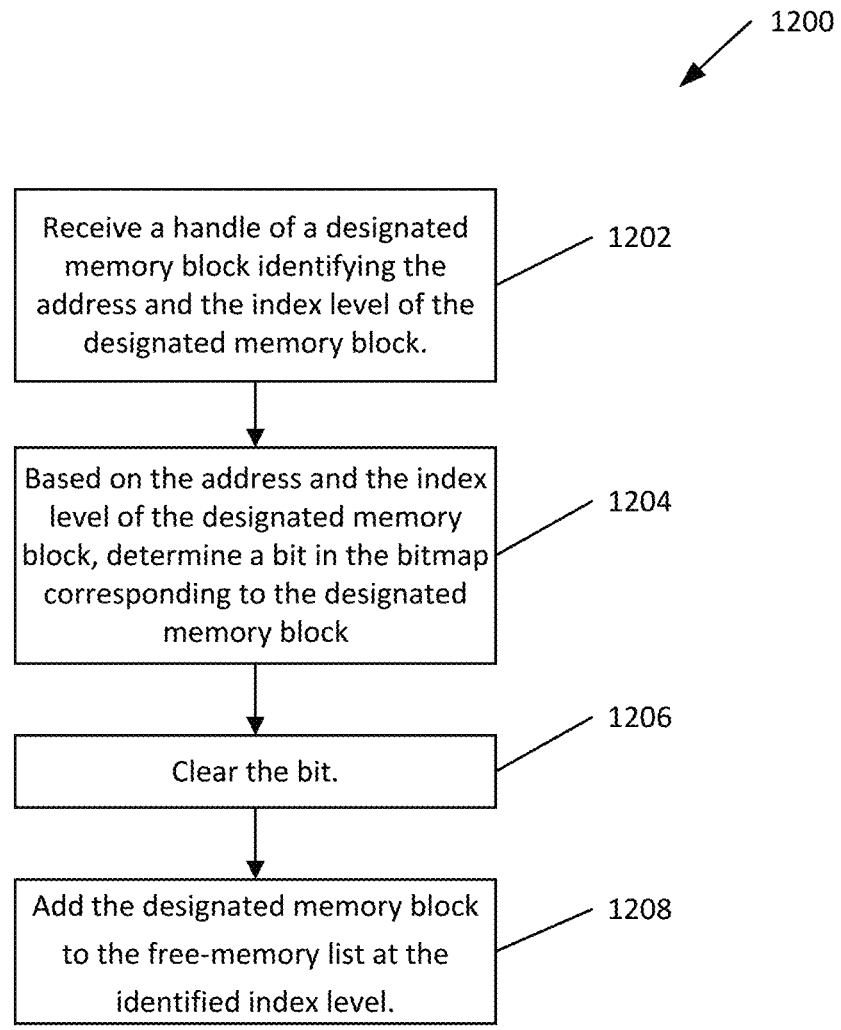

FIG. 15 is a flowchart of an example method 1200 for releasing an allocated memory block. At operation 1202 of the example method 1200, the memory allocator receives a handle of a designated memory block identifying the address and the index level of the designated memory block. At operation 1204 of the example method 1200, the memory allocator, based on the address and the index level of the designated memory block, determines a bit in the bitmap corresponding to the designated memory block. At operation 1206 of the example method 1200, the memory allocator clears the bit in the bitmap. And lastly, at operation 1208 of the example method 1200, the memory allocator adds the designated memory block to the free-memory list at the identified index level.

Figure 16:
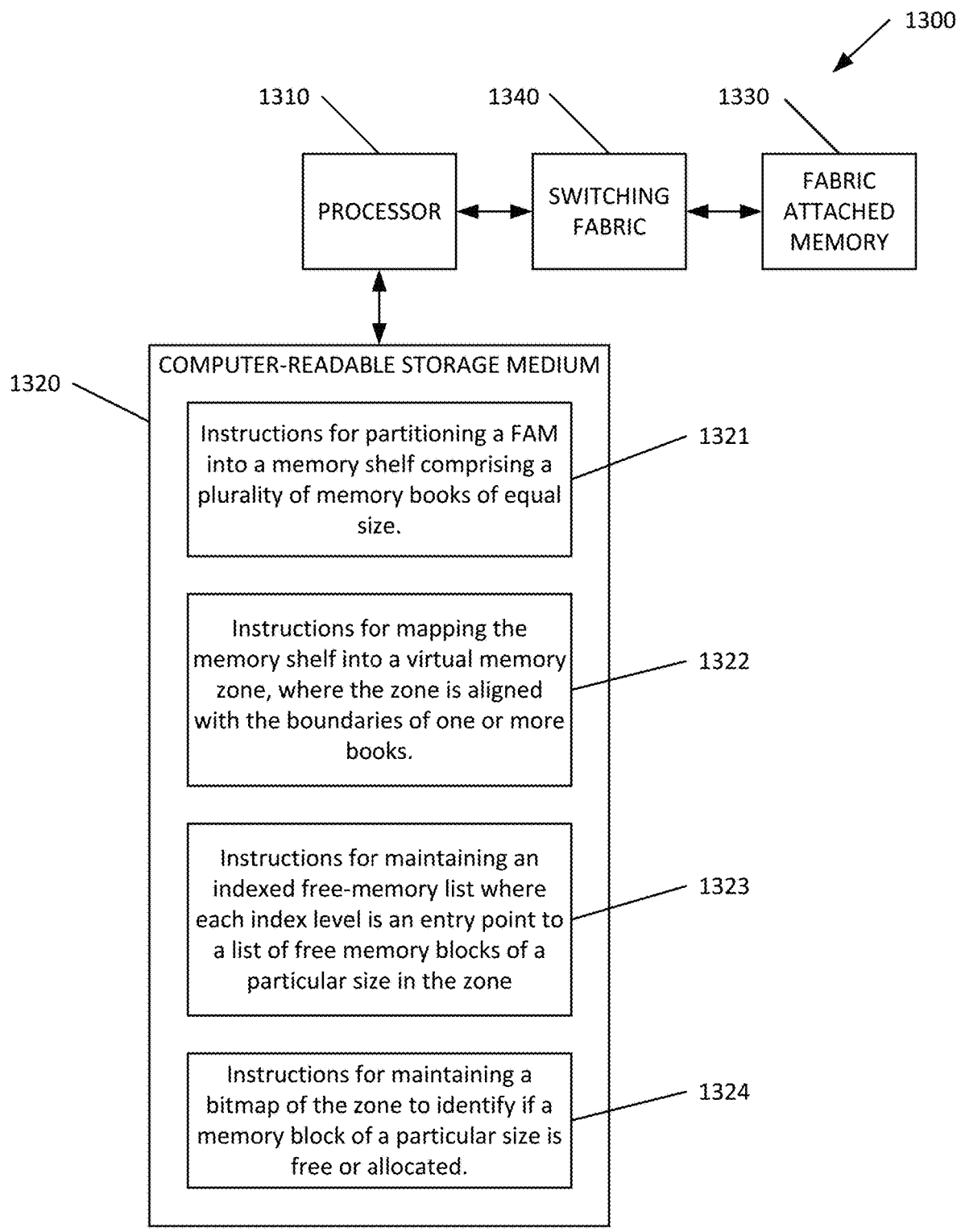
FIG. 16 illustrates a block diagram of an example system with a computer-readable storage medium including instructions executable by a processor for allocating fabric-attached memory.

Referring now to FIG. 16, a block diagram of an example system is illustrated with a non-transitory, computer-readable storage medium, including instructions executable by a processor for managing a pool of shared fabric-attached memory (FAM). The system includes a processor 1310, a non-transitory computer-readable storage medium 1320, a fabric-attached memory 1330, and a switching fabric 1340 for coupling the fabric-attached memory 1330 to the processor. The computer-readable storage medium includes example instructions 1321-1324 executable by the processor 1310. In various examples, the non-transitory, computer-readable storage medium may be any of a variety of storage devices including, but not limited to, a random-access memory (RAM) a dynamic RAM (DRAM), static RAM (SRAM), or the like. In various examples, the processor 1310 may be a general-purpose processor, a controller, special purpose logic, or the like.

The example instructions include instructions 1321 for partitioning the FAM 1320 into a memory shelf (shelf) comprising a plurality of memory books (books) of equal size, as described and illustrated above, for example, with respect to the example memory space 500 of FIG. 5. The example instructions further include example instructions 1322 for mapping a shelf into a virtual memory zone (zone), where the zone is aligned with the boundaries of one or more of the books as illustrated in the example of FIG. 5.

The example instructions also include instructions 1323 for maintaining an indexed free-memory list where each index level is an entry point to a list of free memory blocks of a particular size in the zone, as described and illustrated above, for example, with respect to the example free memory list 700 in FIG. 10. The example instructions further include instruction 1334 for maintaining a bitmap of the zone to identify if a memory block of a particular size is allocated, as described and illustrated above, for example, with respect to the example bitmap 800 of FIG. 11.

Thus, in accordance with various examples provided herein, systems, methods and computer-readable media have been disclosed to describe a memory allocator for a shared, fabric-attached memory. The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products.

It is also noted herein that while the above describes examples, these descriptions should not be viewed in a limiting sense. Rather, there are several variations and modifications which may be made without departing from the scope as defined in the appended claims.

What is claimed is:

1. A system, comprising:
a plurality of processing nodes configured to execute one or more processes, each processing node comprising a processor, a local memory, and a fabric bridge;
a switching fabric comprising a plurality of fabric switch instances, each fabric switch instance coupled to at least one of the plurality of processing nodes via the fabric bridge of the at least one of the plurality of processing nodes;
a fabric-attached memory (FAM) comprising a plurality of memory instances, each memory instance of the FAM being directly coupled to a fabric switch instance of the switching fabric and each fabric switch instance being coupled with at least one other fabric switch instance of the switching fabric;
wherein each memory instance of the FAM is shared by each of the processing nodes such that each memory block within every memory instance, independent of whether the memory block has been previously accessed, allocated or released by a different processing node of the plurality of processing nodes, may be accessed, allocated, and released by each processing node of the plurality of processing nodes;
a memory allocator to allocate and release one or more memory blocks in the FAM in response to memory allocation requests and memory release requests from the one or more processes executed by one or more of the processing nodes,
the memory allocator to partition the FAM into a memory shelf comprising a plurality of memory books of equal size,
the memory allocator to map a shelf into a virtual memory zone, the zone aligned with boundaries of one or more books,
the memory allocator to maintain an indexed free-memory list having a plurality of index levels, where each index level is an entry point to a list of free memory blocks of a particular size in the zone, and
the memory allocator to maintain a bitmap of the zone to identify if a memory block of a particular size is allocated.

2. The system of claim 1, where in response to a request from a process to allocate memory for a memory block that is less than or equal to one-half of any free memory block in the zone, the memory allocator is operative to:
identify a smallest free memory block from the free memory list;
iteratively divide the free memory block into smaller memory blocks until a size of a smaller memory block is larger than the requested memory block size and the requested memory block size is larger than the next memory block size would be after another division;
allocate the smaller memory block by removing the block from the free memory list and setting the corresponding bit in the bitmap; and
return a handle to the process identifying the address and index level of the smaller memory block.

3. The system of claim 1, where in response to a request from a process to allocate memory for a particular size memory block that is larger than the size of any free memory block in the zone, the memory allocator is operative to:
identify a largest pair of contiguous free memory blocks from the free memory list;
merge the contiguous free memory blocks until the size of a merged memory block is larger than the requested memory block size;

remove the merged block from the free memory list and set a corresponding bit in the bitmap; and return a handle to the requesting process identifying an address and an index level of the merged memory block.

4. The system of claim 1, where in response to a request from a process to release a designated memory block, the memory allocator is operative to:

receive a handle of the designated memory block from the process, the handle identifying the address and the index level of the designated memory block;

based on the address and the index level of the designated memory block, determine a bit in the bitmap corresponding to the designated memory block;

clear the bit; and add the designated memory block to the free-memory list at the identified index level.

5. The system of claim 1, wherein to consolidate free memory in the zone, the allocator is operative to:

sort all entries in the free memory list at each index level by memory address;

walk through the sorted entries to identify contiguous memory blocks of the same size; and to iteratively:

merge the contiguous memory blocks at each level into memory blocks of the next largest size, beginning at the index level corresponding to a smallest free memory block size and proceeding to an index level corresponding to a largest free memory block size; and move the merged memory blocks from their current index level to an index level corresponding to a next largest memory block size.

6. The system of claim 1, where when a memory allocation request exceeds available free memory in the zone, the memory allocator is further operative to grow the zone to include additional books in the shelf up to a number limited by a capacity of the shelf.

7. The system of claim 6, where when a memory allocation request exceeds available free memory in the shelf, the memory allocator is further operative to grow the shelf by adding additional books up to a maximum addressable memory space of the system.

8. A method, comprising:

partitioning a shared fabric attached memory (FAM) into a memory shelf comprising a plurality of memory books of equal size, wherein the shared FAM comprises a plurality of memory instances shared between a plurality of processing nodes such that each memory block within every memory instance, independent of whether the memory block has been previously accessed, allocated or released by a different processing node of the plurality of processing nodes, may be accessed, allocated, and released by each processing node of the plurality of processing nodes;

wherein each processing node comprises a processor, a local memory, and a fabric bridge, wherein the processing node is coupled to a switching fabric;

wherein the switching fabric comprises a plurality of fabric switch instances, each fabric switch instance coupled to at least one of the plurality of processing nodes via the fabric bridge of the at least one of the plurality of processing nodes; and wherein each of memory instance of the FAM is directly coupled to a fabric switch instance of the switching fabric and each fabric switch instance is coupled with at least one other fabric switch instance of the switching fabric;

mapping a shelf into a virtual memory zone, the zone aligned with boundaries of one or more books;

maintaining an indexed free-memory list having a plurality of index levels where each index level is an entry point to a list of free memory blocks of a particular size in the zone; and maintaining a bitmap of the zone to identify if a memory block of a particular size is free or allocated.

9. The method of claim 8, further comprising:

receiving a request to allocate memory for a memory block that is less than or equal to one-half of any free memory block in the zone;

identifying a smallest free memory block from the free memory list;

dividing the free memory block into smaller memory blocks until a size of a current memory block is larger than the requested memory block size and the requested memory block size is larger than the next memory block size would be after another division;

removing the current memory block from the free memory list and setting a corresponding bit in the bitmap; and returning a handle identifying an address and an index level of the current memory block.

10. The method of claim 8, further comprising:

receiving a request to allocate memory for a memory block that is larger than any free memory block in the zone;

identifying a largest pair of contiguous free memory blocks from the free memory list;

merging the contiguous free memory blocks until the size of a merged memory block is larger than the requested memory block size;

removing the merged memory block and setting a corresponding bit in the bitmap; and returning a handle identifying an address and an index level of the merged memory block.

11. The method of claim 8, further comprising:

receiving a handle of a designated memory block identifying an address and an index level of the designated memory block;

based on the address and the index level of the designated memory block, determining a bit in the bitmap corresponding to the designated memory block;

clearing the bit; and adding the designated memory block to the free-memory list at the identified index level.

12. A non-transitory computer-readable storage medium encoded with instructions executable by a processor of a computing system, the computer-readable storage medium comprising instructions to:

partition a shared fabric attached memory (FAM) coupled to the processor into a memory shelf comprising a plurality of memory books of equal size, wherein the shared FAM comprises a plurality of memory instances shared between a plurality of processing nodes such that each memory block within every memory instance, independent of whether the memory block has been previously accessed, allocated or released by a different processing node of the plurality of processing nodes, may be accessed, allocated, and released by each processing node of the plurality of processing nodes;

wherein each processing node comprises a processor, a local memory, and a fabric bridge, wherein the processing node is coupled to a switching fabric; wherein the switching fabric comprises a plurality of fabric switch instances, each fabric switch instance coupled to at least one of the plurality of processing nodes via the fabric bridge of the at least one of the plurality of processing nodes; and wherein each of memory instance of the FAM is directly coupled to a fabric switch instance of the switching fabric and each fabric switch instance is coupled with at least one other fabric switch instance of the switching fabric;

map a shelf into a virtual memory zone, maintain an indexed free-memory list having a plurality of index levels where each index level is an entry point to a list of free memory blocks of a particular size in the zone; and maintain a bitmap of the zone to identify if a memory block of a particular size is free or allocated.

13. The non-transitory computer-readable storage medium of claim 12, further comprising instructions to:

receive a request to allocate memory for a memory block that is less than or equal to one-half of any free memory block in the zone;

identify a smallest free memory block from the free memory list;

divide the free memory block into smaller memory blocks until a size of a current memory block is larger than the requested memory block size and the requested memory block size is larger than the next memory block size would be after another division;

remove the current memory block from the free memory list and setting a corresponding bit in the bitmap; and return a handle identifying the address and index level of the current memory block.

14. The non-transitory computer-readable storage medium of claim 12, further comprising instructions to:

receive a request to allocate memory for a memory block that is larger than any free memory block in the zone;

identify a largest pair of contiguous free memory blocks from the free memory list;

merge the contiguous free memory blocks until the size of a merged memory block is larger than the requested memory block size;

remove the merged memory block and set a corresponding bit in the bitmap; and return a handle identifying an address and an index level of the merged memory block.

15. The non-transitory computer-readable storage medium of claim 12, further comprising instructions to:

receive a request to release a designated memory block;

receive a handle of the designated memory block identifying an address and an index level of the designated memory block;

based on the address and the index level of the designated memory block, determine a bit in the bitmap corresponding to the designated memory block;

clear the bit; and add the designated memory block to the free-memory list at the identified index level.

* * * * *